(12) United States Patent  
Mauer

(10) Patent No.: US 7,095,349 B1
(45) Date of Patent: Aug. 22, 2006

(54) NUMERICALLY CONTROLLED OSCILLATOR AND METHOD FOR OPERATING THE SAME

(75) Inventor: Volker Mauer, High Wycombe (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/121,889

(22) Filed: May 3, 2005

(51) Int. Cl.
 *H03M 1/66* (2006.01)
(52) U.S. Cl. ..................................... 341/147
(58) Field of Classification Search ............... 341/144, 341/146, 147, 155, 158; 331/44, 17, 18
 See application file for complete search history.

(56) References Cited

U.S. PATENT DOCUMENTS 5,931,891 A * 8/1999 Landry ...................... 708/271

6,014,682 A * 1/2000 Stephen et al. ............. 708/313

\* cited by examiner

*Primary Examiner*—Brian Young
(74) *Attorney, Agent, or Firm*—Martine Penilla & Gencarella, LLP

(57) ABSTRACT

A numerically controlled oscillator (NCO) is defined to include counter circuitry and integrator circuitry. The counter circuitry includes a first input for receiving a minimum count value, a second input for receiving a maximum count value, and a third input for receiving an increment value. The counter circuitry is defined to generate a counter digital waveform that oscillates between the minimum count value and the maximum count value with a linear slope corresponding to the increment value. The integrator circuitry is defined to compute a running integral of the counter digital waveform. The running integral of the counter digital waveform represents a sinusoidal digital waveform output of the NCO.

20 Claims, 6 Drawing Sheets

NUMERICALLY CONTROLLED OSCILLATOR AND METHOD FOR OPERATING THE SAME

BACKGROUND

Numerically controlled oscillators (NCOs) are used to generate digital representations of sinusoidal waveforms for use in electronic devices. For example, a NCO can be used to generate a digital representation of a sine wave that is in turn processed through a digital-to-analog converter to generate an analog sine wave. The analog sine wave can then be used for a variety of purposes such as a carrier wave for data transmission.

Some conventional NCOs use a lookup table to generate the digital representation of the sine wave. The lookup table includes values of the sine wave corresponding to a number of phase values. NCOs that use the lookup table typically implement a method for traversing a pointer through the lookup table in a closed-loop serial manner. Each value of the sine wave that the pointer points to is output as part of the digital representation of the sine wave. Traversal of the pointer through the lookup table is temporally controlled such that each value of the sine wave is output at an appropriate time. Use of the lookup table can require a large amount of memory, particularly when higher resolution sine wave representations are required. It should be appreciated that the large amount of memory associated with the lookup table can consume a large amount of chip space and power.

Other conventional NCOs use a coordinate rotation digital computer (CORDIC). The CORDIC functions to calculate trigonometric functions such as sine. The CORDIC operates by rotating the phase of a complex number by multiplying the phase by a series of constant values. Thus, the CORDIC will compute an appropriate value of the sine wave to be output from the NCO in accordance with a temporally controlled signal. Implementation of the CORDIC requires a complex logic structure which increases expense by consuming chip space and power.

In view of the foregoing, there is a need for a NCO that does not require either a lookup table or a CORDIC.

SUMMARY

In one embodiment, a numerically controlled oscillator (NCO) is disclosed. The NCO includes counter circuitry and integrator circuitry. The counter circuitry includes a first input for receiving a minimum count value, a second input for receiving a maximum count value, and a third input for receiving an increment value. The counter circuitry is defined to generate a counter digital waveform that oscillates between the minimum count value and the maximum count value with a linear slope corresponding to the increment value. The integrator circuitry is defined to compute a running integral of the counter digital waveform. The running integral of the counter digital waveform represents a sinusoidal digital waveform output of the NCO.

In another embodiment, a sinusoidal digital waveform generation circuit is disclosed. The circuit includes incrementer logic, counter waveform generation logic, and integration logic. The incrementer logic is defined to generate a count increment value in accordance with each cycle of a clock signal. The counter waveform generation logic is defined to receive the count increment value in accordance with each cycle of the clock signal. The counter waveform generation logic is further defined to increment a running count by the count increment value received in accordance with each cycle of the clock signal. The running count represents a counter waveform. The integration logic is defined to compute a running integral of the counter waveform in accordance with each cycle of the clock signal. The running integral as computed by the integration logic represents a sinusoidal digital waveform.

In another embodiment, a method for generating a sinusoidal digital waveform is disclosed. The method includes an operation for generating a symmetric sawtooth digital waveform in accordance with a clock signal. The symmetric sawtooth digital waveform oscillates between a minimum value and a maximum value, wherein each of the minimum value and the maximum value is equidistant from a value of zero. The method also includes an operation for computing a running integral of the symmetric sawtooth digital waveform in accordance with each cycle of the clock signal. The running integral of the symmetric sawtooth digital waveform represents the generated sinusoidal digital waveform.

In another embodiment, a sinusoidal digital waveform generation apparatus is disclosed. The apparatus includes means for generating a count increment value in accordance with each cycle of a clock signal. The apparatus also includes means for incrementing a running count by the count increment value generated in accordance with each cycle of the clock signal. The running count represents a counter waveform that oscillates between a minimum count value and a maximum count value with a linear slope corresponding to an increment value. The apparatus further includes means for computing a running integral of the counter waveform in accordance with each cycle of the clock signal. The computed running integral represents a sinusoidal digital waveform as generated by the apparatus.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
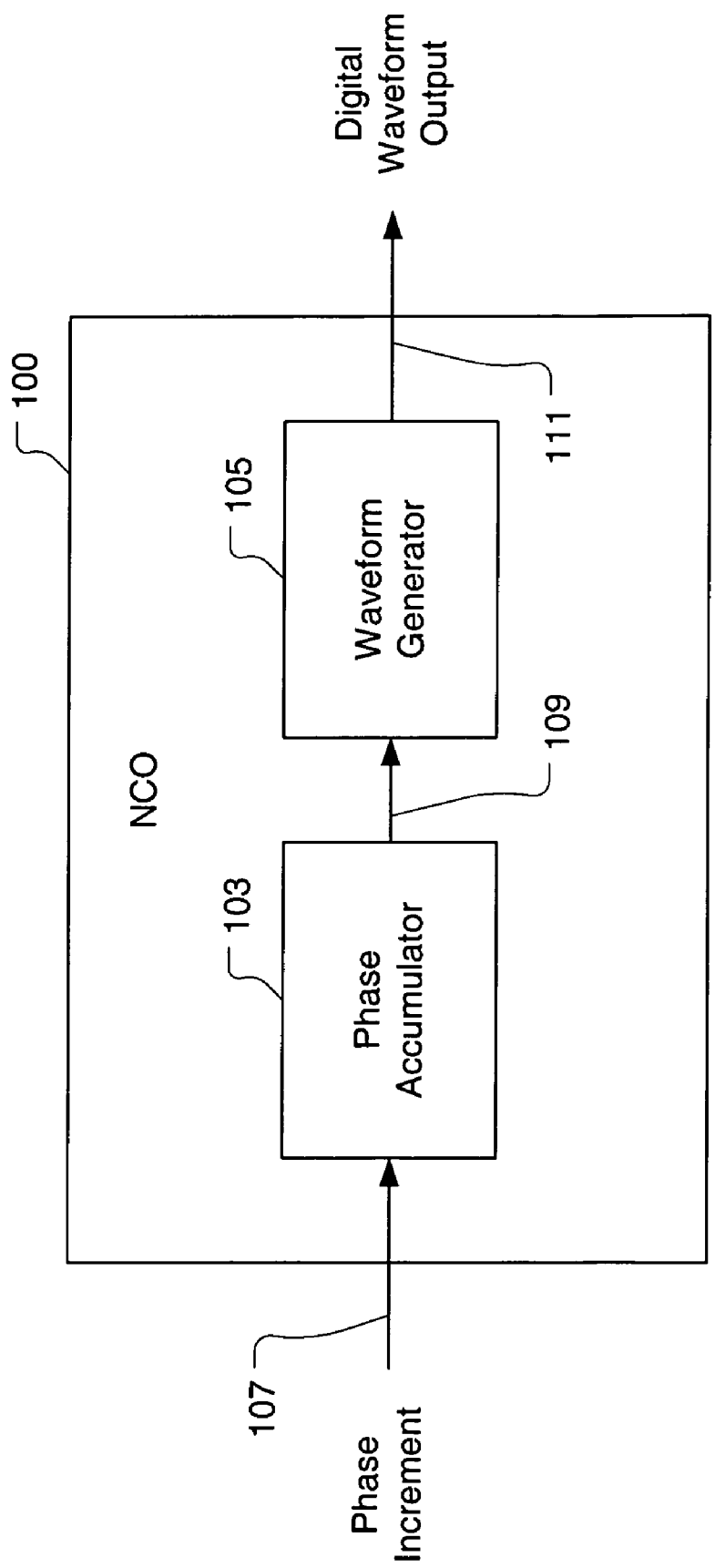
FIG. 1 is an illustration showing an architectural view of a conventional numerically controlled oscillator.

FIG. 1 is an illustration showing an architectural view of a conventional numerically controlled oscillator (NCO) 100. The NCO 100 includes a phase accumulator 103 and a waveform generator 105. The phase accumulator 103 receives a phase increment input, as indicated by arrow 107. Based on the phase increment input, the phase accumulator 103 is configured to send a signal to the waveform generator, as indicated by arrow 109. In response to the signal received from the phase accumulator 103, the waveform generator 105 generates a signal defining a portion of the digital waveform output. The signal generated by the waveform generator 105 is transmitted as an output signal from the NCO 100, as indicated by arrow 111.

In one embodiment, the waveform generator 105 uses a table of values, i.e., lookup table, specifying discrete temporal values of a normalized sinusoidal waveform. It should be appreciated that these discrete temporal values represent a normalized sinusoidal waveform when read in a sequential closed-loop manner. Therefore, outputting values corresponding to the discrete temporal values from the lookup table in the sequential closed-loop manner serves to generate a corresponding digital waveform. Upon receiving an input signal from the phase accumulator, as indicated by arrow 109, the waveform generator 105 functions to output a value from the lookup table representing a subsequent value of the sine wave. The appropriate discrete temporal value to be output by the waveform generator 105 can be tracked by a pointer that traverses through the lookup table in a sequential closed-loop manner. The pointer is moved to a subsequent temporal value upon receipt of the signal from the phase accumulator 103. Therefore, the sine wave values corresponding to the discrete temporal points included within the lookup table are output from the waveform generator 105 in accordance with the phase increment input provided to the phase accumulator 103.

In another embodiment, the waveform generator 105 can be implement using a coordinate rotation digital computer (CORDIC). The CORDIC functions to calculate trigonometric function such as sine. The CORDIC operates by rotating the phase of a complex number by multiplying the phase by a series of constant values. With respect to the conventional NCO 100, when the phase accumulator 103 transmits a signal to the waveform generator 105 in accordance with the phase increment signal, the waveform generator implemented as a CORDIC will compute an appropriate value of the sine wave to be output from the NCO 100.

It should be appreciated that implementing an NCO using lookup tables requires a memory structure for storing the values that define the sinusoidal waveform. Depending on the resolution of the sinusoidal waveform to be generated, the memory structure can be quite large. It should also be appreciated that implementing an NCO using the CORDIC requires instantiation of the CORDIC logic structure, which can be quite complex and require a substantial number of gates. The memory required by the lookup tables and the logic required by the CORDIC each require chip space and increase power consumption. In some electronic devices, particularly small mobile devices, chip space and power are at premiums. Thus, it would be useful to define a numerically controlled oscillator that does not require either lookup tables or CORDIC logic.

Figure 2A:
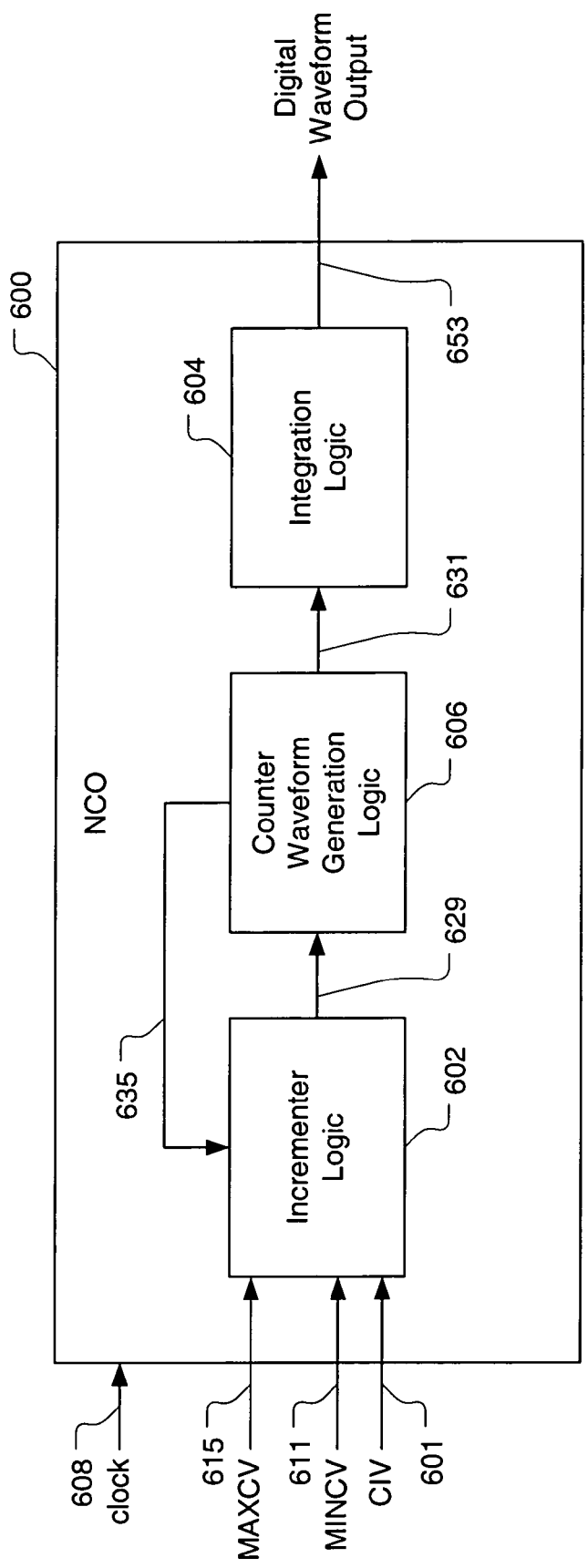
FIG. 2A is an illustration showing an architectural view of a numerically controlled oscillator (NCO), in accordance with one embodiment of the present invention.

FIG. 2A is an illustration showing an architectural view of a numerically controlled oscillator (NCO) 600, in accordance with one embodiment of the present invention. The NCO 600 includes incrementer logic 602, counter waveform generation logic 606, and integration logic 604. The NCO 600 is defined to operate in accordance with a clock signal, as indicated by a connection 608. The incrementer logic 602 is defined to receive as input a maximum counter value (MAXCV) and a minimum counter value (MINCV), as indicated by connections 615 and 611, respectively. It should be noted that the minimum counter value (MINCV) is a negative version of the maximum counter value (MAXCV). Thus, the minimum and maximum counter values have the same magnitude, but opposite signs. The incrementer logic 602 is further defined to receive as input a count increment value (CIV), as indicated by connection 601. The incrementer logic 602 is defined to generate a count increment value in accordance with each cycle of the clock signal. The generated count increment value is communicated from the incrementer logic 602 to the counter waveform generation logic 606, as indicated by connection 629.

The counter waveform generation logic 606 is defined to receive the count increment value from the incrementer logic 602 in accordance with each cycle of the clock signal. The counter waveform generation logic 606 functions to increment a running count by the received count increment value. The running count computed by the counter waveform generation logic 606 represents a counter digital waveform to be used to drive the generation of a sinusoidal digital waveform. It should be appreciated that the counter digital waveform is dependent upon the count increment value received from the incrementer logic 602, vice-versa. Therefore, the incrementer logic 602 and the counter waveform generation logic 606 together represent counter circuitry defined to generate a counter digital waveform that oscillates between the minimum counter value (MINCV) and the maximum counter value (MAXCV) with a linear slope corresponding to the count increment value (CIV). Thus, the counter digital waveform represents a symmetric sawtooth digital waveform.

A feedback connection 635 is provided between the counter waveform generation logic 606 and the incrementer logic 602. The feedback connection 635 enables the value of the counter digital waveform provided at the output of the counter waveform generation logic 606 at each clock cycle to be monitored by the incrementer logic 602. The incrementer logic 602 is defined to evaluate three signals to determine whether the count increment value communicated to the counter waveform generation logic 606 on a subsequent clock cycle should be a positive or negative version of the count increment value (CIV). The three signals include: 1) a signal indicating whether the slope of the counter digital waveform is currently negative or positive, 2) a signal indicating whether the current value of the counter digital waveform matches the minimum counter value (MINCV), and 3) a signal indicating whether the current value of the counter digital waveform matches the maximum counter value (MAXCV).

If the slope of the counter digital waveform is positive and the current value of the counter digital waveform matches or is greater than the maximum counter value (MAXCV), the incrementer logic is defined to communicate a negative version of the count increment value (CIV) to the counter waveform generation logic 606 at the next clock cycle. If the slope of the counter digital waveform is negative and the current value of the counter digital waveform matches or is less than the minimum counter value (MINCV), the incrementer logic is defined to communicate a positive version of the count increment value (CIV) to the counter waveform generation logic 606 at the next clock cycle. If neither of the aforementioned condition combinations exists, the incrementer logic is defined to communicate the same count increment value (CIV) to the counter waveform generation logic 606 at the next clock cycle as communicated at the previous clock cycle. Thus, it should be appreciated that communication of the negative version of the count increment value (CIV) causes the slope of the counter digital waveform to become negative, and communication of the positive version of the count increment value (CIV) causes the slope of the counter digital waveform to become positive.

Each value of the counter digital waveform that is generated at each clock cycle is communicated from the counter waveform generation logic 606 to the integration logic 604, as indicated by connection 631. The integration logic 604 is defined to compute a running integral of the counter digital waveform in accordance with each cycle of the clock signal. In one embodiment, the integration logic 604 is defined to add the value of the counter digital waveform received at each clock cycle to a running sum of the values of the digital waveform received at all preceding clock cycles. It should be appreciated that the value of the digital waveform received at a given clock cycle can be either positive or negative and is added as such. The running integral computed by the integration logic 604 based on the counter digital waveform, i.e., symmetric sawtooth digital waveform, represents a sinusoidal digital waveform. Thus, the output of the integration logic 604, i.e., the output of the NCO 600, provided at connection 653 is a sinusoidal digital waveform.

Figure 2B:
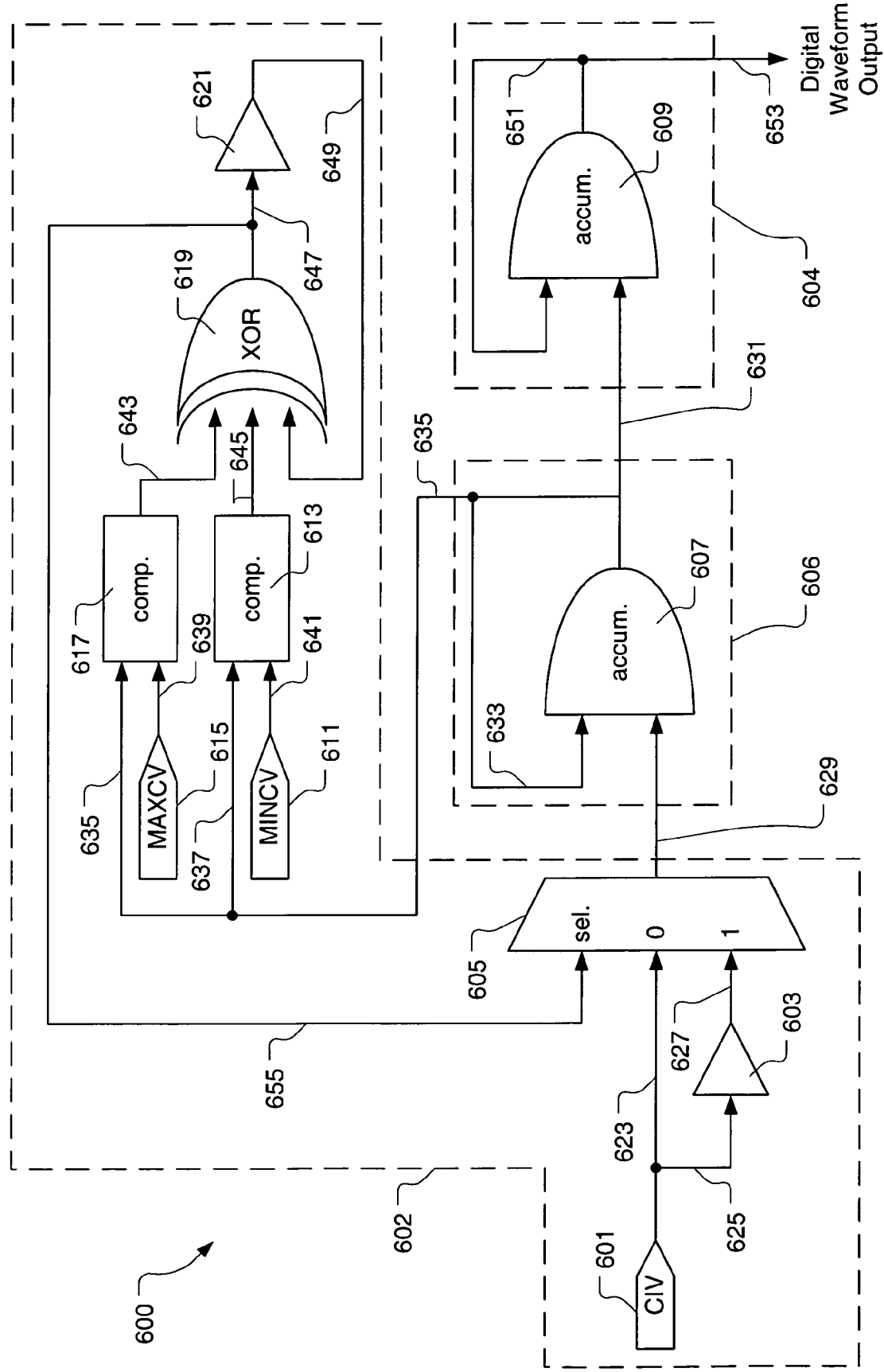
FIG. 2B is an illustration showing a logic diagram for the NCO, in accordance with one embodiment of the present invention.

FIG. 2B is an illustration showing a logic diagram for the NCO 600, in accordance with one embodiment of the present invention. Each of the incrementer logic 602, the counter waveform generation logic 606, and the integration logic 604, as previously described with respect to FIG. 2A, is shown by respective dashed lines in FIG. 2B. The incrementer logic 602 includes a two-to-one multiplexer (MUX) 605 defined to output either of two input signals received on connections 623 and 627, in accordance with both a select signal received on connection 655 and a clock signal. The input signal provided to the MUX 605 on connection 623 is the count increment value (CIV) received as input to the NCO 600 through connection 601. In the present embodiment, the count increment value (CIV) is provided to the NCO 600 as a positive value. The count increment value (CIV) is also transmitted through a branch connection 625 to an inverter 603. The inverter 603 functions to reverse the sign of the count increment value (CIV). Thus, a negative version of the count increment value is provided as the input signal to the MUX 605 on connection 627. If the select signal received by the MUX 605 on connection 655 is low, i.e., "0", the positive count increment value (CIV) is output from the MUX 605 on connection 629. However, if the select signal received by the MUX 605 on connection 655 is high, i.e., "1", the negative count increment value (CIV) is output from the MUX 605 on connection 629.

The counter waveform generation logic 606 includes an accumulator 607. The accumulator 607 is defined to receive two inputs: 1) the output from the MUX 605 through connection 629, and 2) the output generated by the accumulator 607 on the previous clock cycle through connection 633. It should be appreciated that the output of the accumulator 607 is registered to enable the output generated by the accumulator 607 on the previous clock cycle to be provided as input to the accumulator 607 at the current clock cycle. The accumulator 607 functions to compute and output a sum of the two inputs received on connections 629 and 633. Thus, at each clock cycle the accumulator 607 adds the output from the MUX 605, i.e., either the positive or negative version of the count increment value (CIV), to the previous sum computed by the accumulator 607. The output of the accumulator 607 provided on connections 631, 633, and 635 represents the counter digital waveform as previously discussed with respect to FIG. 2A.

Before proceeding with discussion of the integration logic 604, it is useful to first describe the feedback connection 635 and its relevance to determining the select signal to be communicated to the MUX 605 on connection 655. The feedback connection 635 serves to communicate the output of the accumulator 607 to each of a first comparator 613 and a second comparator 617 within the incrementer logic 602. The first comparator 613 also receives as an input the minimum counter value (MINCV) through connection 641. The first comparator 613 functions to output a low signal, i.e., "0", if the output of the accumulator 607 is greater than the minimum counter value (MINCV). However, if the output of the accumulator 607 is less than or equal to the minimum counter value (MINCV), the first comparator 613 will output a high signal, i.e., "1." The second comparator 617 also receives as an input the maximum counter value (MAXCV) through connection 639. The second comparator 617 functions to output a low signal, i.e., "0", if the output of the accumulator 607 is less than the maximum counter value (MAXCV). However, if the output of the accumulator 607 is greater than or equal to the maximum counter value (MAXCV), the first comparator 613 will output a high signal, i.e., "1."

Each of the first comparator 613 and the second comparator 617 provides their respective output to an XOR gate 619, as indicated by connections 645 and 643, respectively. The XOR gate 619 is further defined to receive a third input representing an inverted state of the signal output from the XOR gate 619 at a previous clock cycle. More specifically, the output signal of the XOR gate 619 is transmitted to a buffer 621 through connection 647. The buffer 621 functions to invert a state of the output signal received from the XOR gate 619. The inverted XOR gate 619 output signal is transmitted from the buffer 621 back to the input of the XOR gate 619 as indicated by connection 649. It should be appreciated that the state of the signal on connection 649 in a current clock cycle represents an inverted state of the signal output by the XOR gate 619 on an immediately preceding clock cycle. The feedback of the inverted XOR gate 619 output to the XOR gate 619 input represents the signal indicating whether the slope of the counter digital waveform is currently negative or positive. It should be appreciated that knowledge regarding the slope direction of the counter digital waveform is required to determine whether the count increment value to be communicated from the MUX 605 to the accumulator 607 on a subsequent clock cycle should be a positive or negative version of the count increment value (CIV).

Based on the input from the first comparator 613, the input from the second comparator 617, and the inverted feedback from the XOR gate 619 output, the XOR gate 619 generates an output signal to be used as the select signal for the MUX 605 via the connection 655. A select signal representing a low state, i.e., "0", will cause the MUX 605 to transmit the positive version of the count increment value (CIV) to the accumulator 607. Conversely, a select signal representing a high state, i.e., "1", will cause the MUX 605 to transmit the negative version of the count increment value (CIV) to the accumulator 607. From the incrementer logic 602 of FIG. 2B, it can be seen that the state of the select signal on a previous clock cycle will be maintained unless the output of either the first comparator 613 or the second comparator 617 is a high signal, i.e., "1." Thus, if the outputs of both the first comparator 613 and the second comparator 617 are low signals, i.e., "0", the state of the select signal on connection 655 will remain the same as in the previous clock cycle. However, if the output of the first comparator 613 is a high signal, i.e., "1", the state of the select signal will change from high to low, thus the MUX 605 will transmit the positive version of the count increment value (CIV) rather than continuing to transmit the negative version thereof. Furthermore, if the output of the second comparator 617 is a high signal, i.e., "1", the state of the select signal will change from low to high, thus the MUX 605 will transmit the negative version of the count increment value (CIV) rather than continuing to transmit the positive version thereof. Based on the descriptions of the incrementer logic 602 and the counter waveform generation logic 606 as provided above, it should be appreciated that the counter digital waveform output from the accumulator 607 is a symmetric sawtooth waveform that oscillates between the minimum counter value (MINCV) and the maximum counter value (MAXCV) with a linear slope corresponding to the count increment value (CIV).

At each clock cycle, a subsequent value of the counter digital waveform is transmitted from the accumulator 607 to the integration logic 604 via connection 631. The integration logic includes an accumulator 609 defined to receive two inputs: 1) the current value of the counter digital waveform as output from the accumulator 607 through connection 631, and 2) the output generated by the accumulator 609 on the previous clock cycle through connection 651. It should be appreciated that the output of the accumulator 609 is registered to enable the output generated by the accumulator 609 on the previous clock cycle to be provided as input to the accumulator 609 at the current clock cycle. The accumulator 609 functions to compute and output a sum of the two inputs received on connections 631 and 651. Thus, at each clock cycle the accumulator 609 adds the output from the accumulator 607, i.e., the current value of the counter digital waveform, to the previous sum computed by the accumulator 609. The output of the accumulator 609 provided on connection 653 represents the sinusoidal digital waveform to be output by the NCO 600.

Figure 3:
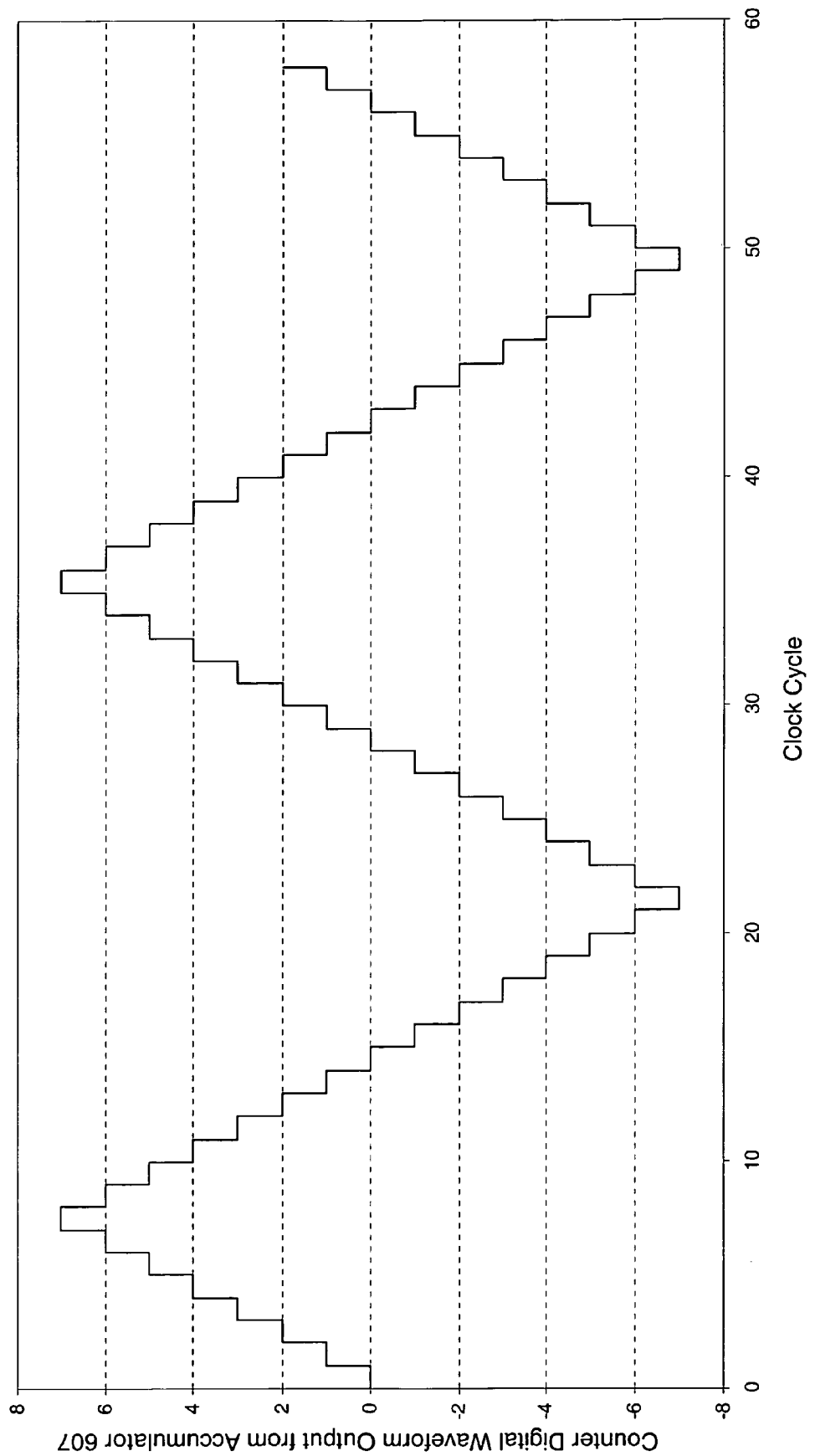
FIG. 3 is an illustration showing the counter digital waveform as output from the accumulator, in accordance with one embodiment of the present invention.
Figure 4:
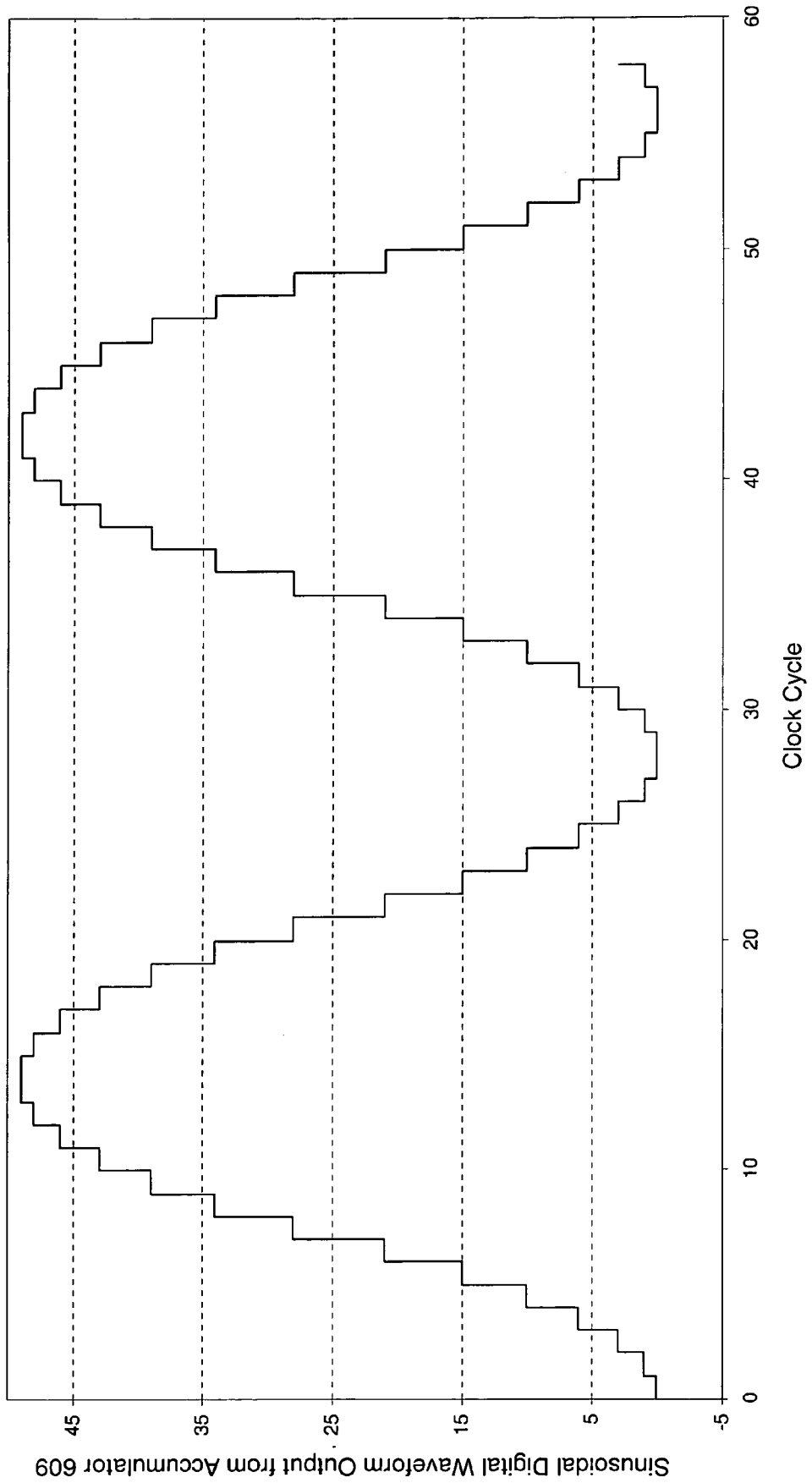
FIG. 4 is an illustration showing the sinusoidal digital waveform as output from the accumulator, in accordance with the embodiment of FIG. 3.

FIG. 3 is an illustration showing the counter digital waveform as output from the accumulator 607, in accordance with one embodiment of the present invention. In the embodiment of FIG. 3, the maximum counter value (MAXCV) equals +7, the minimum counter value (MINCV) equals −7, and the count increment value (CIV) equals 1. FIG. 4 is an illustration showing the sinusoidal digital waveform as output from the accumulator 609, in accordance with the embodiment of FIG. 3. Table 1 shows the following NCO 600 operational information during clock cycles 0 through 27 of the embodiment depicted in FIGS. 3 and 4:

the state of the select signal communicated to the MUX 605 on connection 655, the output of the MUX 605 as communicated to the accumulator 607, the output of the accumulator 607, i.e., the counter digital waveform, and the output of the accumulator 609, i.e., the sinusoidal digital waveform.

It should be appreciated that the NCO 600 logic presented in FIGS. 2A and 2B represents a sinusoidal digital waveform generation apparatus, in accordance with one embodiment of the present invention. The incrementer logic 602 and components defined therein represent means for generating a count increment value in accordance with each cycle of a clock signal. The counter waveform generation logic 606 and components defined therein represent means for incrementing a running count by the count increment value generated in accordance with each cycle of the clock signal. As previously discussed, the running count represents a counter waveform that oscillates between a minimum count value and a maximum count value with a linear slope corresponding to an increment value.

Additionally, the integration logic 604 represents means for computing a running integral of the counter waveform in accordance with each cycle of the clock signal, wherein the running integral represents a sinusoidal digital waveform. It should be appreciated that the instantiations of the incrementer logic 602, the counter waveform generation logic 606, and the integration logic 604, as depicted in FIG. 2B, represent exemplary instantiations of the respective logic structures (602, 606, 604). In other embodiments, each of the incrementer logic 602, the counter waveform generation logic 606, and the integration logic 604 can be defined with more or less circuit components than explicitly depicted in FIG. 2B, while maintaining the functionality of each respective logic structure (602, 606, 604) as previously discussed.

TABLE 1

NCO Operation Information for Embodiment of FIGS. 3 and 4

| Clock Cycle | Select Signal/ Connection (655) | MUX (605) Output/ Connection (629) | Accumulator (607) Output/ Connection (631) | Accumulator (609) Output/ Connection (653) |
|---|---|---|---|---|
| 0 | 0 | 0 | 0 | 0 |
| 1 | 0 | 1 | 1 | 1 |
| 2 | 0 | 1 | 2 | 3 |
| 3 | 0 | 1 | 3 | 6 |
| 4 | 0 | 1 | 4 | 10 |
| 5 | 0 | 1 | 5 | 15 |
| 6 | 0 | 1 | 6 | 21 |
| 7 | 0 | 1 | 7 | 28 |
| 8 | 1 | −1 | 6 | 34 |
| 9 | 1 | −1 | 5 | 39 |
| 10 | 1 | −1 | 4 | 43 |
| 11 | 1 | −1 | 3 | 46 |
| 12 | 1 | −1 | 2 | 48 |
| 13 | 1 | −1 | 1 | 49 |
| 14 | 1 | −1 | 0 | 49 |
| 15 | 1 | −1 | −1 | 48 |
| 16 | 1 | −1 | −2 | 46 |
| 17 | 1 | −1 | −3 | 43 |
| 18 | 1 | −1 | −4 | 39 |
| 19 | 1 | −1 | −5 | 34 |
| 20 | 1 | −1 | −6 | 28 |
| 21 | 1 | −1 | −7 | 21 |
| 22 | 0 | 1 | −6 | 15 |
| 23 | 0 | 1 | −5 | 10 |
| 24 | 0 | 1 | −4 | 6 |
| 25 | 0 | 1 | −3 | 3 |
| 26 | 0 | 1 | −2 | 1 |
| 27 | 0 | 1 | −1 | 0 |

Figure 5:
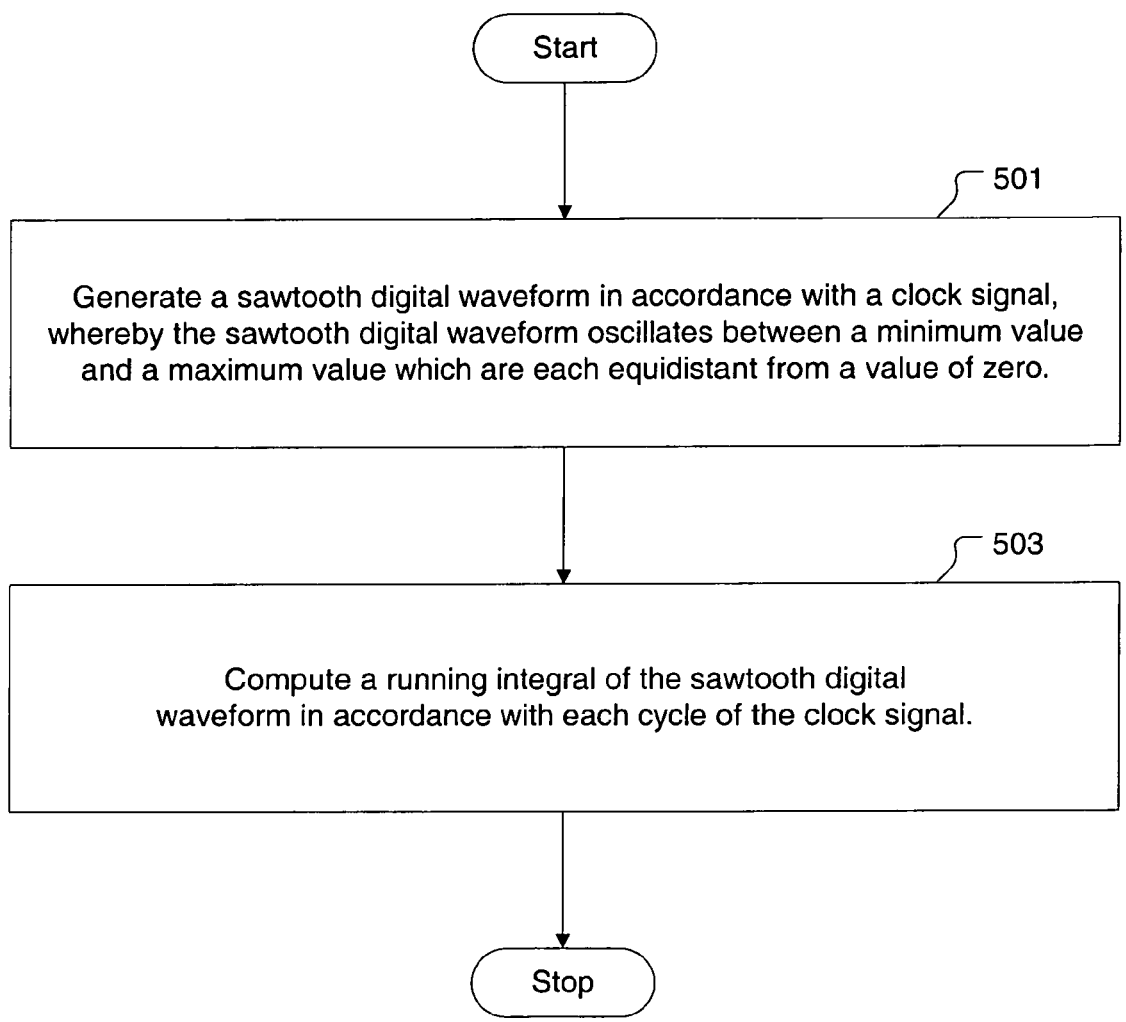
FIG. 5 is an illustration showing a flowchart of a method for generating a sinusoidal digital waveform, in accordance with one embodiment of the present invention.

FIG. 5 is an illustration showing a flowchart of a method for generating a sinusoidal digital waveform, in accordance with one embodiment of the present invention. The method includes an operation 501 for generating a symmetric sawtooth digital waveform in accordance with a clock signal. The symmetric sawtooth digital waveform is generated to oscillate between a minimum value and a maximum value, wherein each of the minimum value and the maximum value is equidistant from a value of zero. In one embodiment, the generated symmetric sawtooth waveform represents a counter value that changes by a constant amount at each cycle of the clock signal. In one embodiment, an integer value of one defines the constant amount of change in the symmetric sawtooth waveform at each cycle of the clock signal.

The method also includes an operation 503 for computing a running integral of the symmetric sawtooth digital waveform in accordance with each cycle of the clock signal. The running integral of the symmetric sawtooth digital waveform for a present clock cycle represents a sum of the counter value for the present clock cycle and a value of the running integral of the symmetric sawtooth digital waveform computed for an immediately preceding clock cycle. It should be appreciated that the running integral of the symmetric sawtooth digital waveform represents a sinusoidal digital waveform when viewed as a function of clock cycle. In one embodiment, the method can include an operation for adjusting both an amplitude and a frequency of the sinusoidal waveform by modifying the minimum value and the maximum value between the which the symmetric sawtooth digital waveform oscillates.

The numerically controlled oscillator (600) described herein may be incorporated into a programmable logic device. The programmable logic device may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A numerically controlled oscillator, comprising:
    counter circuitry including a first input for receiving a minimum count value, a second input for receiving a maximum count value, and a third input for receiving an increment value, the counter circuitry being defined to generate a counter digital waveform that oscillates between the minimum count value and the maximum count value with a linear slope corresponding to the increment value; and
    integrator circuitry defined to compute a running integral of the counter digital waveform, wherein the running integral of the counter digital waveform represents a sinusoidal digital waveform output of the numerically controlled oscillator.

2. The numerically controlled oscillator of claim 1, wherein the counter circuitry includes incrementer logic defined to generate a count increment value in accordance with each cycle of a clock signal, the count increment value being either a positive or negative version of the increment value to be received through the third input.

3. The numerically controlled oscillator of claim 2, wherein the counter circuitry further includes counter digital waveform generation logic defined to receive the count increment value from the incrementer logic in accordance with each clock cycle and add the received count increment value to a value of the counter digital waveform from an immediately preceding clock cycle.

4. The numerically controlled oscillator of claim 3, further comprising:
    a feedback connection between an output of the counter digital waveform generation logic and the incrementer logic, the feedback connection defined to enable the incrementer logic to monitor a value of the counter digital waveform at each clock cycle.

5. The numerically controlled oscillator of claim 4, wherein the incrementer logic is defined to generate the count increment value for a given clock cycle as a negative version of the increment value as received through the third input when the value of the counter digital waveform for an immediately preceding clock cycle has reached the maximum count value as received through the second input, the incrementer logic being defined to generate the count increment value for a given clock cycle as a positive version of the increment value as received through the third input when the value of the counter digital waveform for an immediately preceding clock cycle has reached the minimum count value as received through the first input.

6. The numerically controlled oscillator of claim 1, wherein the integrator circuitry includes an accumulator defined to receive as an input a value of the counter digital waveform generated by the counter circuitry at each clock cycle, the accumulator defined to add the value of the counter digital waveform at each clock cycle to a value of the counter digital waveform from an immediately preceding clock cycle.

7. The numerically controlled oscillator of claim 1, wherein each of the counter circuitry and the integrator circuitry is defined without a memory for storing a lookup table.

8. A sinusoidal digital waveform generation circuit, comprising:
    incrementer logic defined to generate a count increment value in accordance with each cycle of a clock signal;
    counter waveform generation logic defined to receive the count increment value in accordance with each cycle of the clock signal, the counter waveform generation logic further defined to increment a running count by the count increment value received in accordance with each cycle of the clock signal, the running count representing a counter waveform; and
    integration logic defined to compute a running integral of the counter waveform in accordance with each cycle of the clock signal, wherein the running integral represents a sinusoidal digital waveform.

9. The sinusoidal digital waveform generation circuit of claim 8, wherein the incrementer logic includes a multiplexer defined to output either of two input values in accordance with a select signal to be received at each cycle of the clock signal, a first of the two input values being a positive version of the count increment value, a second of the two input values being a negative version of the count increment value.

10. The sinusoidal digital waveform generation circuit of claim 9, wherein the select signal is generated based on the running count output by the counter waveform generation logic, the select signal being set to cause the positive version of the count increment value to be output from the multiplexer when the running count is either increasing toward a maximum count value or has reached a minimum count value, the select signal being set to cause the negative version of the count increment value to be output from the multiplexer when the running count is either decreasing toward a minimum count value or has reached a maximum count value.

11. The sinusoidal digital waveform generation circuit of claim 10, wherein each of the minimum count value and the maximum count value are inputs to the incrementer logic, the minimum count value being a negative version of the maximum count value.

12. The sinusoidal digital waveform generation circuit of claim 8, wherein the count increment value is an input to the incrementer logic.

13. The sinusoidal digital waveform generation circuit of claim 8, wherein the integration logic includes an accumulator defined to receive as an input at each cycle of the clock signal a value of the counter waveform having been updated by the count increment value, the accumulator defined to add the received value of the counter waveform to a previous value of the counter waveform corresponding to an immediately preceding cycle of the clock signal.

14. The sinusoidal digital waveform generation circuit of claim 8, wherein each of the incrementer logic, the counter waveform generation logic, and the integration logic is defined without a memory for storing a lookup table.

15. A method for generating a sinusoidal digital waveform, comprising:
   generating a symmetric sawtooth digital waveform in accordance with a clock signal, wherein the symmetric sawtooth digital waveform oscillates between a minimum value and a maximum value, each of the minimum value and the maximum value being equidistant from a value of zero; and
   computing a running integral of the symmetric sawtooth digital waveform in accordance with each cycle of the clock signal, the running integral of the symmetric sawtooth digital waveform representing a sinusoidal digital waveform.

16. The method of claim 15, wherein the generated symmetric sawtooth digital waveform represents a counter value that changes with each cycle of the clock signal.

17. The method of claim 16, wherein the running integral of the symmetric sawtooth digital waveform for a present clock cycle represents a sum of the counter value for the present clock cycle and a value of the running integral of the symmetric sawtooth digital waveform computed for an immediately preceding clock cycle.

18. The method of claim 16, wherein a magnitude of the counter value changes by a constant amount at each cycle of the clock signal.

19. The method of claim 18, wherein the constant amount is an integer value of one.

20. The method of claim 15, further comprising:
   adjusting both an amplitude and frequency of the sinusoidal digital waveform by modifying the minimum and maximum values.

* * * * *